United States Patent [19]
Kita et al.

[11] Patent Number: 5,616,527
[45] Date of Patent: Apr. 1, 1997

[54] COMPOSITE CERAMIC

[75] Inventors: Hideki Kita; Wenjea J. Tseng, both of Fujisawa, Japan

[73] Assignee: Isuzu Motors Limited, Tokyo, Japan

[21] Appl. No.: 593,282

[22] Filed: Jan. 30, 1996

Related U.S. Application Data

[63] Continuation of Ser. No. 297,556, Aug. 26, 1994, abandoned.

[30] Foreign Application Priority Data

Sep. 13, 1993 [JP] Japan .................................. 5-249718
Oct. 29, 1993 [JP] Japan .................................. 5-292525

[51] Int. Cl.$^6$ .................................................. C04B 35/596
[52] U.S. Cl. .......................... 501/97; 501/95; 501/98
[58] Field of Search .................................. 501/97, 98, 95

[56] References Cited

U.S. PATENT DOCUMENTS

| | | | |
|---|---|---|---|
| 4,987,104 | 1/1991 | Trigg | 501/97 X |
| 5,110,773 | 5/1992 | Corral et al. | 501/98 |
| 5,128,285 | 7/1992 | Yokoi et al. | 501/97 X |
| 5,145,812 | 9/1992 | Arai et al. | 501/97 |
| 5,369,065 | 11/1994 | Yoshimura et al. | 501/97 |

FOREIGN PATENT DOCUMENTS

| | | |
|---|---|---|
| 881731983 | 5/1983 | Japan . |
| 1522711984 | 8/1984 | Japan . |
| 346771984 | 8/1984 | Japan . |
| 346781984 | 8/1984 | Japan . |
| 2078771984 | 11/1984 | Japan . |
| 2078761984 | 11/1984 | Japan . |
| 2176731984 | 12/1984 | Japan . |
| 1864701985 | 9/1985 | Japan . |
| 2967711990 | 12/1990 | Japan . |
| 2189741991 | 9/1991 | Japan . |
| 2616621991 | 11/1991 | Japan . |

*Primary Examiner*—Karl Group
*Attorney, Agent, or Firm*—Browdy and Neimark

[57] ABSTRACT

A composite ceramic is produced by forming a mixed powder of Si and a compound oxide as the starting material into a formed material, nitriding and firing the formed material to form a sinter, and subjecting the sinter to oxidation treatment. The composite ceramic, which is:lightweight and reduced in heat conductivity, has a specific gravity of at most 2.6, and comprises a phase composed of all of elements Si, O and N, and at least one element selected from the element group consisting of Al, Zr, Li, P and Mg, in which phase a subphase composed of Si, Al, 0 and N and a subphase composed of Si, O and N are formed. Another composite ceramic has pores and a disperse phase in a matrix phase composed of $Si_3N_4$ crystal grains, an oxide and an oxynitride, and further comprises coarse $Si_3N_4$ grains dispersed in the matrix phase with O-containing boundary reaction product layers formed in the boundaries between the matrix phase and the coarse $Si_3N_4$ grains. Thus, this composite ceramic, though reduced in heat conductivity, has a high toughness and a high strength due to dispersion of the coarse $Si_3N_4$ grains in the matrix phase.

9 Claims, 5 Drawing Sheets

COMPOSITE CERAMIC

This application is a continuation of parent application Ser. No. 08/297,556, filed Aug. 26, 1994 now abandoned.

BACKGROUND OF THE INVENTION

1. Field of the Invention

The present invention relates to a lightweight composite ceramic with low heat conductivity and high fracture toughness, and a process for producing the same.

2. Description of the Prior Art

Conventional methods wherein an oxide is added to silicon (Si) and the resulting mixture is reaction-sintered for the purpose of promoting nitriding of Si and enhancing the strength of the resulting sinter are disclosed in, e.g., Japanese Patent Laid-Open No. 88,173/1983, Japanese Patent Laid-Open No. 152,271/1984, Japanese Patent Laid-Open No. 207,876/1984, Japanese Patent Laid-Open No. 207,877/1984, Japanese Patent Laid-Open No. 217,673/1984, Japanese Patent Laid-Open No. 186,470/1985, Japanese Patent Publication No. 34,677/1984, and Japanese Patent Publication No. 34,678/1984. Further, lowly heat-conductive ceramics already examined as materials for use in engines include aluminum titanate ($Al_2TiO_5$) and partially stabilized zirconia ($ZrO_2$), and some of them have been put into practical use.

Further, Japanese Patent Laid-Open No. 261,662/1991 discloses a ceramic composition and a process for producing a ceramic member therefrom. The above ceramic composition comprises a metallic Si powder or a mixed powder thereof with a ceramic powder, an organic binder added thereto in an amount of 6 to 25 wt. % based on the total weight of the composition, a deflocculant, and water. The above ceramic powder comprises at least one of $Si_3N_4$, $Al_2TiO_5$, mullite and potassium titanate, and is prepared through firing in an atmosphere of nitrogen.

Further, Japanese Patent Laid-Open No. 296,771/1990 discloses a composite ceramic and a process for producing the same. This composite ceramic is a dense sinter composed of composite particles formed from a material comprising a first ceramic and second ceramic particles dispersed therein and having a sintering temperature lower than that of the first ceramic. Herein, the second ceramic is lower in heat conductivity than the first ceramic.

However, the fact is that the aforementioned ceramic produced by adding an oxide to Si and reaction-sintering the resulting mixture for the purpose of promoting nitriding of Si and enhancing the strength thereof is not well lowered in heat conductivity. Further, $Al_2TiO_5$ has a strength of at most 50 MPa and hence cannot be used as such as a structural ceramic for engines and the like, for which the above-mentioned strength is too low. Furthermore, $ZrO_2$, though having a high strength, has a high thermal expansion coefficient to develop a high thermal stress disadvantageously.

Meanwhile, the quantity (Q) of heat transfer to a member in an unsteady state is represented by the formula: $Q=(2.\kappa.c.\rho.T/\pi)^{1/2}\times\Delta\theta_o\times A$, wherein A is the surface area, $\Delta\theta_o$ is the temperature amplitude on the surface, T is the temperature on the surface, $\kappa$ is the heat conductivity, c is the heat capacity or specific heat, and $\rho$ is the density, or specific gravity.

As is understandable from the above formula, the product of heat conductivity ($\kappa$), specific heat (c) and specific gravity ($\rho$) must be small in an aspect of the properties of a material used in the member in order to decrease the quantity (Q) of heat transfer. However, the square root $(\kappa\times c\times\rho)^{1/2}$ of the value of the above product is 5 for $ZrO_2$ and 8.7 for $Si_3N_4$. In view of the above, supposing that the heat conductivity ($\kappa$), specific heat (c) and specific gravity ($\upsilon$) of a material are low, for example, in the case of a lightweight and lowly heat-conductive material having a heat conductivity ($\kappa$) of 2.1 W/m.K, a specific heat (c) of 0.7 J/g.K and a specific gravity ($\rho$) of about 2.2, the value of the above square root becomes about 1.8, which means that the quantity (Q) of heat transfer can be decreased to about 36% of that of $ZrO_2$ and about 20% of that of $Si_3N_4$.

There is also known silicon nitride ($Si_3N_4$) prepared as a low heat-conductive ceramic by dispersing ceramic whiskers in a matrix material and reaction-sintering them in order to improve the toughness thereof. Further, procedures of adding an oxide such as $Al_2O_3$ or $Y_2O_3$ to Si and reaction-sintering them with a view to enhancing the strength of the resulting sinter are disclosed in, e.g., Japanese Patent Laid-Open No. 152,271/1984 and Japanese Patent Laid-Open No. 207,876/1984.

Further, Japanese Patent Laid-Open No. 218,974/1991 discloses a silicon nitride sinter and a process for producing the same. This silicon nitride sinter has a microstructure comprising 20 to 50% of particles having a length of at least 10 μm and 20 to 50 of particles having a length of at most 3 μm, and has properties such as a heat conductivity of 0.13 to 0.16 cal/cm.°C and a four-point flexural strength at room temperature of at least 800 MPa.

However, the above low heat-conductive ceramic obtained by dispersing ceramic whiskers in a matrix material and reaction-sintering them has a fracture toughness ($K_{IC}$) of about 4 to 5 MPa.m$^{1/2}$, and hardly brings about phonon scattering because of the absence of a different phase in the grain boundaries and hence is not sufficiently low in heat conductivity. Further, a target for improving the toughness of a ceramic has been a reaction product $\beta$-$Si_3N_4$. Thus, there have been no ceramics comprising an oxide dispersed in the matrix phase thereof for the purpose of lowering the heat conductivity thereof.

SUMMARY OF THE INVENTION

A principal object of the present invention is to solve the foregoing problems and thereby provide a low-heat-conductivity composite ceramic produced through reaction-sintering of a mixed powder of Si and a compound oxide as the starting material in an atmosphere of nitrogen and subsequent oxidation treatment of the resulting sinter, i.e., heat treatment thereof in an atmosphere of air, and a process for producing the same. This composite ceramic is lightweight, and is lowered in heat conductivity as compared with the conventional composite ceramics of Si with a simple oxide. The above compound oxide to be used may comprise at least one member selected from the group consisting of $Al_6Si_2O_{13}$ (mullite), $(ZrO)_2P_2O_7$, $Li_2O.Al_2O_3.SiO_2$ [LAS], $MgO.Al_2O_3.SiO_2$ [MAS], and $Al_2TiO_5$ (aluminum titanate).

This composite ceramic according to the present invention has a phase composed of all of elements Si, O and N, and at least one element selected from the group consisting of Al, Zr, Li, P and Mg, and has a specific gravity of at most 2.6. Thus, every one zone of the above phase comprises a subphase adjoined by subphases, or surrounded by subphases.

For example, when $Al_6Si_2O_{13}$ is used as the compound oxide, the resulting composite ceramic comprises triple-subphase capsules including Si-O-N as the nuclei surrounded by Si—Al—O—N further surrounded by Al—O. Further, when $Al_2TiO_5$ is used as the compound oxide, the resulting composite ceramic comprises triple-subphase capsules including $Al_2O_3$ as the nuclei surrounded by Ti—O further surrounded by Si—Al—Ti—O—N.

The process for producing this composite ceramic according to the present invention comprises forming a mixed powder of Si and a compound oxide as the starting material into a formed material, nitriding and firing the formed material to form a sinter, and then subjecting the sinter to oxidation treatment.

In the foregoing process for preparing the composite ceramic, the amount of the above compound oxide to be contained in the mixed powder may be in the range of 15 to 65 wt. % based on the total weight of the mixed powder. When the amount of the compound oxide added to the Si powder is smaller than 15 wt. %, the resulting composite ceramic is not a low heat-conductive material as required in the present invention. On the other hand, when it exceeds 65 wt. %, the reaction sintering of the mixed powder becomes difficult so that there may be failure to obtain a sinter having a desired strength and a low heat conductivity.

Since the composite ceramic according to the present invention can be produced through nitriding and firing of a mixture of the compound oxide and Si as the starting material and subsequent oxidation treatment thereof, the composite ceramic may comprise a disperse phase constituted of multiple subphases unlike the conventional ceramics produced through addition of a simple oxide such as $Al_2O_3$. These multiple subphases are formed through decomposition of the compound oxide and reactions of the compound oxide with Si and $N_2$ in an atmosphere thereof in the course of nitriding and firing the mixture.

Since this composite ceramic according to the present invention is produced through nitriding and subsequent heat treatment of the mixture of Si and the compound oxide as the starting material, a mixed phase or a specific solid solution is formed on a nanogram level unlike composite ceramics of Si with a simple oxide, and hence the multiple phase thereof can bring about scattering of phonons as the carrier of heat in the boundaries therebetween to endow the composite ceramic with a low heat conductivity.

Further, in this composite ceramic according to the present invention, a subphase composed of Si, Al, O and N and a subphase composed of Si, O and N may be formed in the above phase or the above disperse phase. Furthermore, in this composite ceramic, every one zone of the above phase or the above disperse phase may have an Al-rich phase in the central portion thereof.

Accordingly, this composite ceramic according to the present invention is lightweight and has a high strength and a low heat conductivity to enable the quantity of heat transfer in an unsteady state to be decreased when applied to heat-shielding parts of engines, etc. For example, this composite ceramic is applicable to engine parts such as suction and exhaust ports, manifolds, piston heads, and turbine scrolls.

Another object of the present invention is to solve the aforementioned problems and thereby provide a composite ceramic endowed with a high fracture toughness, a high four-point flexural strength and a low heat conductivity by coating coarse silicon nitride particles with an oxide and reaction-sintering them to form a composite ceramic comprising the silicon nitride dispersed in the matrix phase, and a process for producing the same.

The term "toughness" as used herein is a measured value ($K_{IC}$) of fracture toughness. The value $K_{IC}$ of fracture toughness is a critical stress intensity factor, which is a material constant for evaluation of the mechanical function of a ceramic. The fracture strength of a ceramic depends on the size of a crack latently existing in a material according to Griffith. The tensile strength ($\sigma_f$) at fracture due to growth of a crack is represented by the following formula: $\sigma_f = K_{IC}/(\pi c)^{1/2}$ wherein $K_{IC}$ is the value of fracture toughness, which is the critical value of stress intensity factor; and c is the length of a surface crack or the radius of an=internal circular crack.

The above composite ceramic according to the present invention has a porosity of at least 10%, and comprises coarse $Si_3N_4$ grains or fibers dispersed in a matrix phase composed of $Si_3N_4$ crystal grains of at most 3 μm in average size, an oxide and an oxynitride with O-containing reaction product layers formed in the boundaries between the matrix phase and the coarse $Si_3N_4$ grains or fibers. Accordingly, this composite ceramic can be improved in strength to have a high fracture toughness ($K_{IC}$) and a high four-point flexural strength, while enjoying a low heat conductivity. More specifically, it is believed that dispersion of the $Si_3N_4$ grains in the matrix phase may produce such a roundabout, or deflective, effect of the $Si_3N_4$ grains as to require a larger amount of energy to thereby enhance the fracture toughness of the composite ceramic and improve the strength of the composite ceramic.

Meanwhile, in this composite ceramic, the above oxide and the above oxynitride may be one of $Si_2$, $TiO_2$, $Al_6Si_2O_{13}$, $Al_2O_3$, SiAlON, TiON, SiON and $TiAl_2O_5$, or a composite substance thereof.

Further, the average size of the coarse $Si_3N_4$ grains is at least 10 μm, and a solid solution may be formed in the coarse $Si_3N_4$ grains. The coarse $Si_3N_4$ grains may be $\beta$-$Si_3N_4$.

A process for producing this composite ceramic oxidizing the according to the present invention comprises the step of surface of a coarse $Si_3N_4$ powder, and the step of oxidizing the mixing the resulting powder with Si and oxide powders, forming the resulting mixture into a formed material, and firing the formed material to produce a ceramic with a high toughness and a low heat conductivity.

Another process for producing this composite ceramic according to the present invention comprises the step of immersing a coarse $Si_3N_4$ powder in a solution of an alkoxide, the step of heat-treating the alkoxide-coated coarse $Si_3N_4$ powder, and the step of mixing the heat-treated powder with Si and oxide powders, forming the resulting mixture into a formed material, and firing the formed material to produce a ceramic with a high toughness and a low heat conductivity.

A still another process for producing this composite ceramic according to the present invention comprises the step of calcining a coarse $Si_3N_4$ powder together with an oxide such as $Al_2O_3$ or $Y_2O_3$ to effect solid solution thereof, and the step of mixing the resulting powder with Si and oxide powders, forming the resulting mixture into a formed material, and firing the formed material to produce a ceramic with a high toughness and a low heat conductivity.

This composite ceramic can be produced according to the following steps. Specifically, the surfaces of coarse $Si_3N_4$ grains, or short or medium-length ceramic fibers are coated with oxide films through use of an alkoxide, and then dispersed in a matrix phase of a reaction-sintered $Si_3N_4$ combined with an oxide. In the course of sintering thereof, the coating layers are reacted with the matrix phase to secure a good bond state. This increases the boundary energy of the ceramic during crack propagation thereof to improve the fracture toughness ($K_{IC}$) thereof. Furthermore, this composite ceramic is increased in scattering of phonons as the carrier of heat in the boundaries between the mutually different phases to be lowered in heat conductivity.

DETAILED DESCRIPTION OF THE EMBODIMENTS

Figure 1:
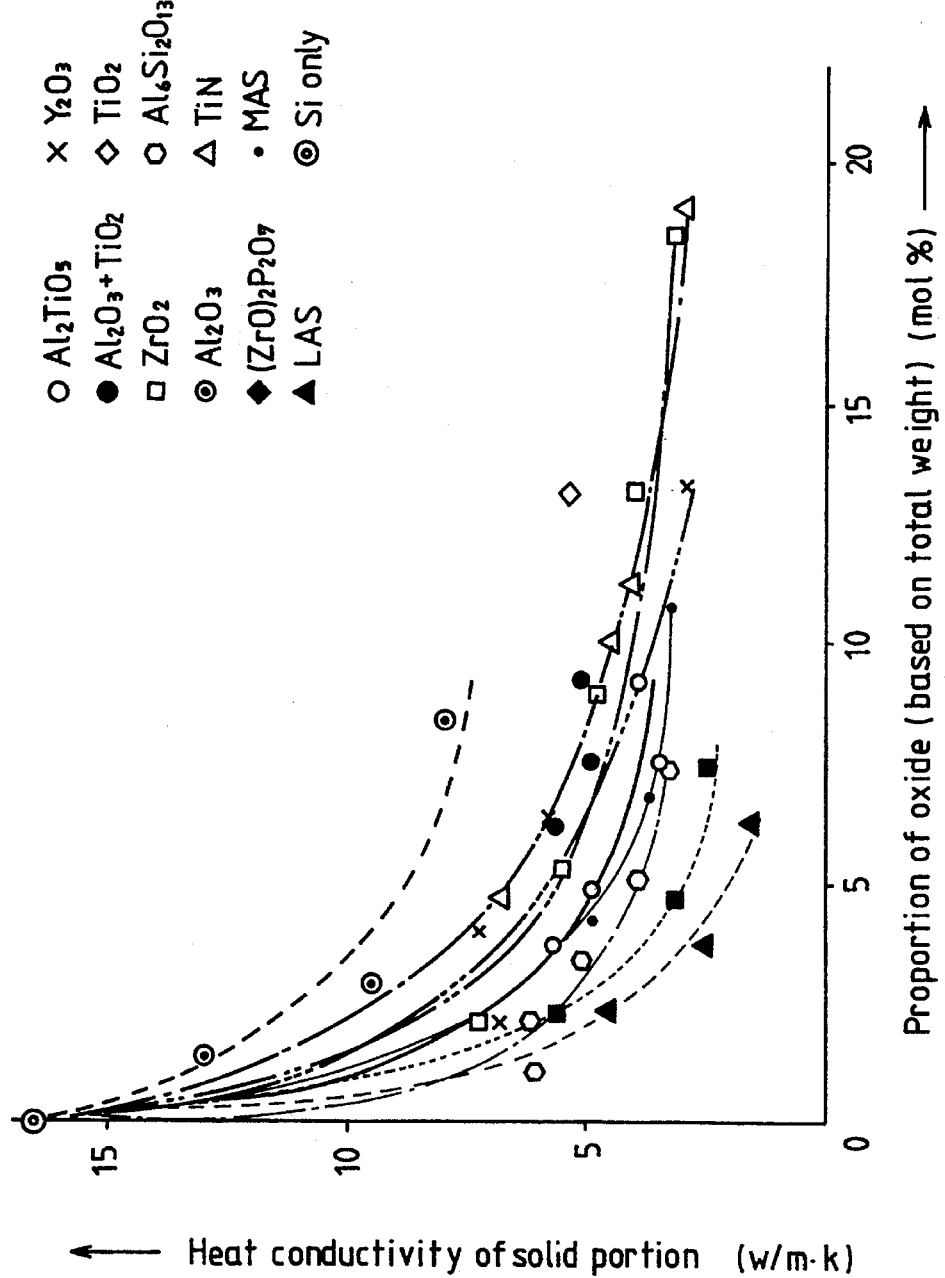
FIG. 1 is a graph showing the heat conductivity versus oxide proportion relationships of reaction-sintered ceramics each produced using a mixed powder of Si and a variety of oxide powder as the starting material.

Examples of the composite ceramic and process of the present invention will now be described while referring to the accompanying drawings and Tables.

In the process for producing a composite ceramic according to the present invention, predetermined amounts of Si and oxide powders as the staring materials were weighed out, and admixed with distilled water, the amount of which was 1.5 times as much as the total weight of the two powders. They were ball-milled using $Si_3N_4$ balls as the medium for 24 hours to prepare a mixture. This mixture was well dried and pulverized by ball milling for 15 hours to prepare a mixed powder. The mixed powder was placed in a mold, preliminarily molded by monoaxial pressurization, and then formed into a formed material of 15×15×80 mm by CIP. This formed material was placed in a firing furnace, and then heated in a 0.93 MPa atmosphere of $N_2$ up to the maximum temperature of 1,400° C. to form a sinter. The sinter was subjected to oxidation treatment. The oxidation treatment involved heating the sinter in air at 320° C./hr up to a predetermined temperature, and keeping it at the predetermined temperature for 1 hour.

In order to measure the heat conductivity of the resulting sinter, pellets of 1.5±0.03 mm were formed as test pieces for measurement of heat conductivity from the sinter. Further, the sinter was ground to form flexural test pieces of 3×3×40 mm. The heat conductivity was measured at room temperature by laser flashing, while the strength was measured by the four-point flexural method. The number of test pieces were at least 20 for every set of the oxidation treatment conditions, while the span and the crosshead speed were set at 30 mm and 5 mm/min, respectively.

A test piece was submerged in water in a vacuum vessel, which was depressurized to at most 60 mmHg, and then kept in that state for about 48 hours. The test piece was lightly wiped with a paper towel to remove water drops adherent to the surface thereof, and then weighed. A weight increase from the weight of the test piece before water absorption to that after water absorption was divided by the density of water and the volume of the test piece at a temperatures during the foregoing test. The resulting value was taken as the porosity of the test piece. When the heat conductivity of the solid portion of a porous material is to be calculated in the case where the heat conductivity ($\lambda$) of the porous material is known and the heat conductivity ($\lambda_s$) of the solid portion of the porous material is unknown, the relationship of them with the porosity (P) of the porous material is represented by the following formula. In the present invention, $\lambda_s$ was calculated from $\lambda$ and P experimentally found according to the same following formula:

$$\lambda = 1/A + B$$

wherein $A = (1-P^{1/3})/\lambda_s$;

$B = P^{1/3}/[(1-P^{2/3}) \times \lambda_s + P^{2/3} \times \lambda_g]$;

P is the porosity of the porous material; $\lambda$ is the heat conductivity of the porous material; $\lambda_s$ is the heat conductivity of the solid portion of the porous material; and $\lambda_g$ is the heat conductivity of a gas for which the heat conductivity (=0.0478 w/m.K) of air was used.

FIG. 1 shows the heat conductivities ($\lambda_s$) of the solid portions of reaction-sintered composite materials, or composite ceramics, each produced using as the starting material a mixed powder of an Si powder and a powder of an additive(s) selected from among a variety of oxides and a nitride. In FIG. 1, the ordinate represents the heat conductivity ($\lambda_s$) of solid portion, the plotted values ($\lambda_s$) of which are values (W/m.K) calculated from the found values of heat conductivity ($\lambda$) and porosity (P) according to the above-mentioned formula. In FIG. 1, the abscissa represents the proportion of the additive(s) selected from among the oxides and the nitride in terms of mol. % based on the total weight. The additives used are $Al_2TiO_5$, $Al_2O_3 + TiO_2$, $ZrO_2$, $Al_2O_3$, $(ZrO)_2P_3O_7$, $Li_2O.Al_2O_3.SiO_2$ [LAS], $Y_2O_3$, $TiO_2$, $Al_6Si_2O_{13}$, TiN, and $MgO.Al_2O_3.SiO_2$ [MAS]. One sinter material was produced using Si alone without using any additives.

When consideration is given to the heat conductivities shown in FIG. 1, it is understandable that the decremental rate of heat conductivity differs from additive to additive. For example, it is understood that the heat conductivity decreasing effects of compound oxides such as $Al_2TiO_5$, $Al_6Si_2O_{13}$, $(ZrO)_2P_2O_7$, LAS, and MAS were larger than those of $Al_2O_3$ and $Al_2O_3+TiO_2$ (simultaneously added to form a composite material). On the other hand, sinter materials produced respectively using $ZrO_2$, $La_2O_3$, $CeO_2$, and $Y_2O_3$ as additives were notably lowered in strength after being heated at 800° C. because of micro-cracking.

The properties of the sinters each obtained using a mixed powder of Si and a compound oxide as the starting material are shown in Table 1. In Table 1, the "proportion (wt. %)" in the "Preparation conditions" represents a value calculated by dividing the weight of an oxide by the total weight of the mixed powder (weight of Si and oxide) and multiplying the resulting value by 100. The proportion of a compound oxide, mullite ($Al_6Si_2O_{13}$), contained in the mixed powder was in the range of 15 to 65 wt. % based on the total weight of the mixed powder. When the above proportion of the compound oxide added to the Si powder is lower than 15 wt. % based on the total weight of the mixed powder, no sinter with a low heat conductivity as required in the present invention can be obtained. On the other hand, when it exceeds 65 wt. %, reaction sintering of them may be difficult to fail to obtain a sinter having a desired strength and a low heat conductivity.

in air at 1,000° C., i.e., subjected to oxidation treatment, to prepare a composite ceramic sinter.

For comparison with the composite ceramic sinter (invention product) of Example 1, Si and $Al_6Si_2O_{13}$ (45 wt. %) were blended with each other, and reaction-sintered in an atmosphere of $N_2$ in the same manner to form a sinter of Comparative Example 1. Further, Si was blended with $Al_2O_3$ and $SiO_2$ (45 wt. %), and the resulting mixed powder was reaction-sintered in an atmosphere of $N_2$ to form a sinter of Comparative Example 2. The heat conductivities and flexural strengths of these sinter samples are shown in Table 2.

TABLE 1

Properties of Sinters Obtained Using Mixed Powder of Si and Compound Oxide

| | Preparation conditions proportion of oxide to total weight of Si and oxide | | Properties of sinter | | | | |
|---|---|---|---|---|---|---|---|
| additive | proportion wt. % | forming pressure MPa | heat conductivity W/m · K | four-point flexural strength MPa | specific gravity | Young's modulus GPa | thermal expansion coefficient ×10$^{-6}$/°C. |
| $Al_6Si_2O_{13}$ | 15 | 98 | 2.53 | 278 | 2.6 | 78 | 2.8 |
| | 25 | 49 | 2.49 | 266 | 2.5 | 89 | 2.9 |
| | 25 | 98 | 2.66 | 271 | 2.6 | 95 | 3.0 |
| | 35 | 49 | 2.11 | 196 | 2.1 | 66 | 3.0 |
| | 35 | 98 | 2.26 | 200 | 2.3 | 78 | 3.0 |
| | 35 | 196 | 2.41 | 215 | 2.4 | 85 | 3.1 |
| | 45 | 98 | 2.33 | 210 | 2.5 | 89 | 3.2 |
| | 55 | 98 | 2.49 | 165 | 2.6 | 92 | 3.2 |
| | 65 | 98 | 2.52 | 148 | 2.6 | 88 | 3.3 |
| LAS | 35 | 49 | 2.24 | 220 | 2.3 | 76 | 2.9 |
| | 35 | 78 | 2.36 | 216 | 2.4 | 86 | 3.0 |
| MAS | 35 | 49 | 2.34 | 210 | 2.5 | 86 | 2.9 |
| | 35 | 78 | 2.46 | 222 | 2.5 | 92 | 3.0 |
| | 35 | 98 | 2.49 | 217 | 2.6 | 100 | 3.1 |
| $(ZrO)_2 \cdot P_2O_7$ | 35 | 49 | 2.16 | 206 | 2.4 | 85 | 3.2 |
| | 35 | 78 | 2.31 | 201 | 2.5 | 93 | 3.2 |
| | 35 | 98 | 2.66 | 221 | 2.6 | 96 | 3.1 |

Note:
"proportion wt. %" represents a value calculated by dividing the weight of an oxide by the total weight of a mixed powder (weight of Si and oxide) and multiplying the resulting value by 100.

A description will now be made on Example 1 wherein mullite ($Al_6Si_2O_{13}$) was used as the compound oxide in the process for producing a composite ceramic according to the present invention.

Example 1

Si was blended with $Al_6Si_2O_{13}$ at a proportion of the latter of 15 to 65 wt. % (as shown in Table 1, wherein 45 wt. % ≈ 7.5 mol. %) to prepare a mixed powder as the starting material. The mixed powder was formed into a formed material, which was reaction-sintered in an atmosphere of $N_2$ at 1,400° C., to form a sinter. The sinter was heat-treated

TABLE 2

Samples Produced Using $Al_6Si_2O_{13}$ as Compound Oxide

| | Blending material | Proportion | Heat conductivity (W/m · K) | Flexural strength (MPa) |
|---|---|---|---|---|
| Ex. 1 | $Al_6Si_2O_{13}$ | 15–65 wt. % (see Table 1) | 2.1–2.5 | see Table 1 |
| Comp. Ex. 1 | $Al_6Si_2O_{13}$ | 7.5 mol. % ≈45 wt. % | 3.3 | 194 |
| Comp. Ex. 2 | $Al_2O_3 + SiO_2$ | 7.5 mol. % ≈45 wt. % | 4.1 | 172 |

Figure 2:
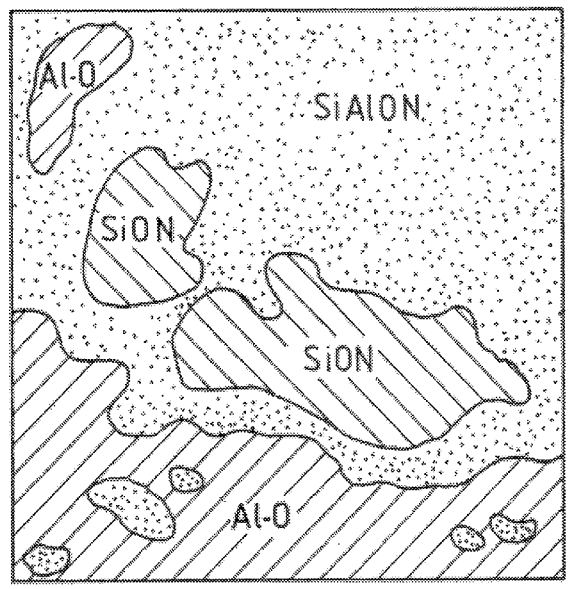
FIG. 2 is an illustration showing the microstructure of a composite ceramic produced by reaction-sintering a mixture of Si and $Al_6Si_2O_{13}$ as the starting material and subjecting the resulting sinter to oxidation treatment.
Figure 3:
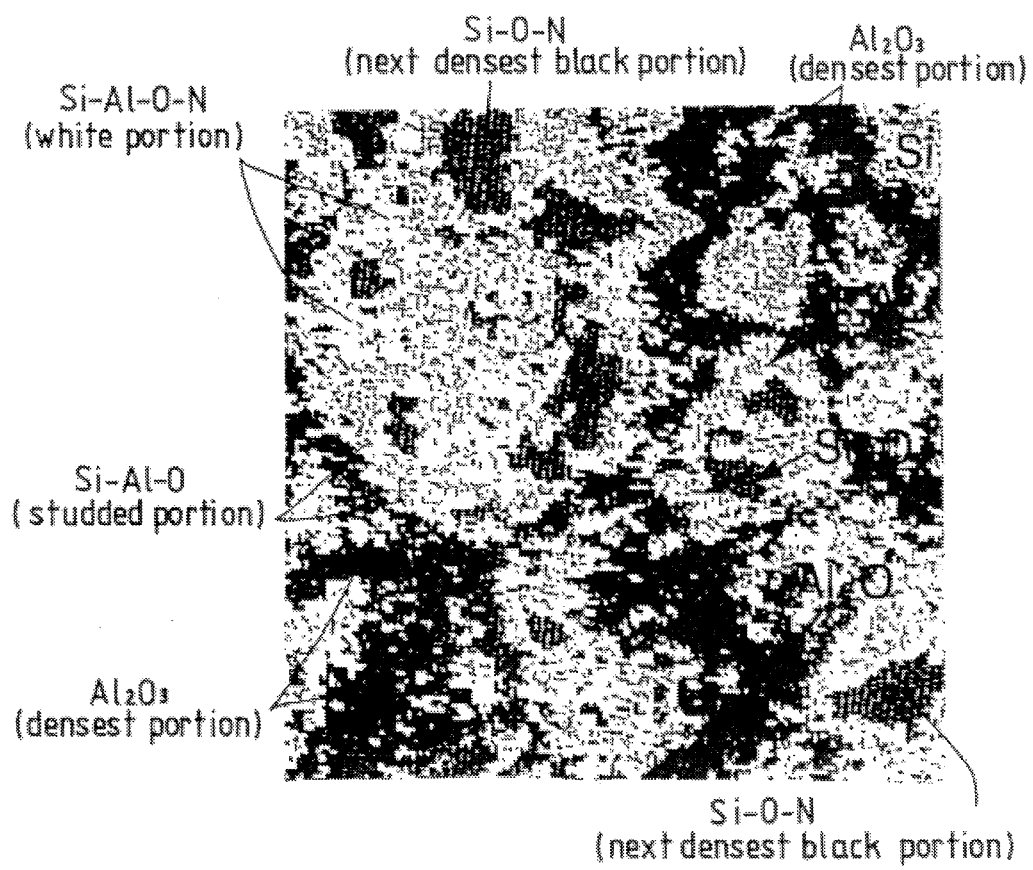
FIG. 3 is an analytic illustration drawn by an X-ray microanalyzer and showing the result of identification of the texture of a composite ceramic produced by reaction-sintering a mixture of Si and $Al_6Si_2O_{13}$ and subjecting the resulting sinter to oxidation treatment according to the process of the present invention for producing a composite ceramic.

It is understandable from the foregoing comparison that a sinter can be further lowered in heat conductivity when subjected to oxidation treatment after reaction sintering. However, it should be noted that the heat conductivity of a sample produced using $Al_6Si_2O_{13}$ as shown in FIG. 1 is 2.6 to 2.7 W/m.K as the real heat conductivity corrected based on the porosity thereof. Further, it is believed that the rest of Si was converted into $SiO_2$ through oxidation thereof because 7.5 mol. %=45 wt. %. A composite ceramic sinter produced according to the aforementioned procedure in Example 1 was cut and polished on the cut surface thereof to examine the element distribution of the cut surface with an X-ray microanalyzer. The results are shown in FIGS. 2 and FIG. 2 is a reproduction of an illustration drawn by an X-ray microanalyzer for showing the microtexture of the obtained sinter and the results of identification of phases formed in the sinter and for demonstrating the state of Si, Al, O and N existing in the sinter. FIG. 3 is an analytic illustration drawn by an X-ray microanalyzer and showing the texture of the composite ceramic produced according to the aforementioned procedure of producing a composite ceramic. In FIG. 3, the densest black portions indicate $Al_2O_3$ (Al—O), the next densest black portions Si—O—N, the white portions Si—Al—O—N, and the finely studded portions in the white portions Si—Al—O ($Al_6Si_2O_{13}$). It is understandable from FIGS. 2 and 3 that an Si—O—N phase, i.e., an Si- and O-rich phase, as a center is surrounded by an Si, Al - and O-rich phase formed therearound which is surrounded by an Al- and O-rich phase formed therearound.

Figure 6:
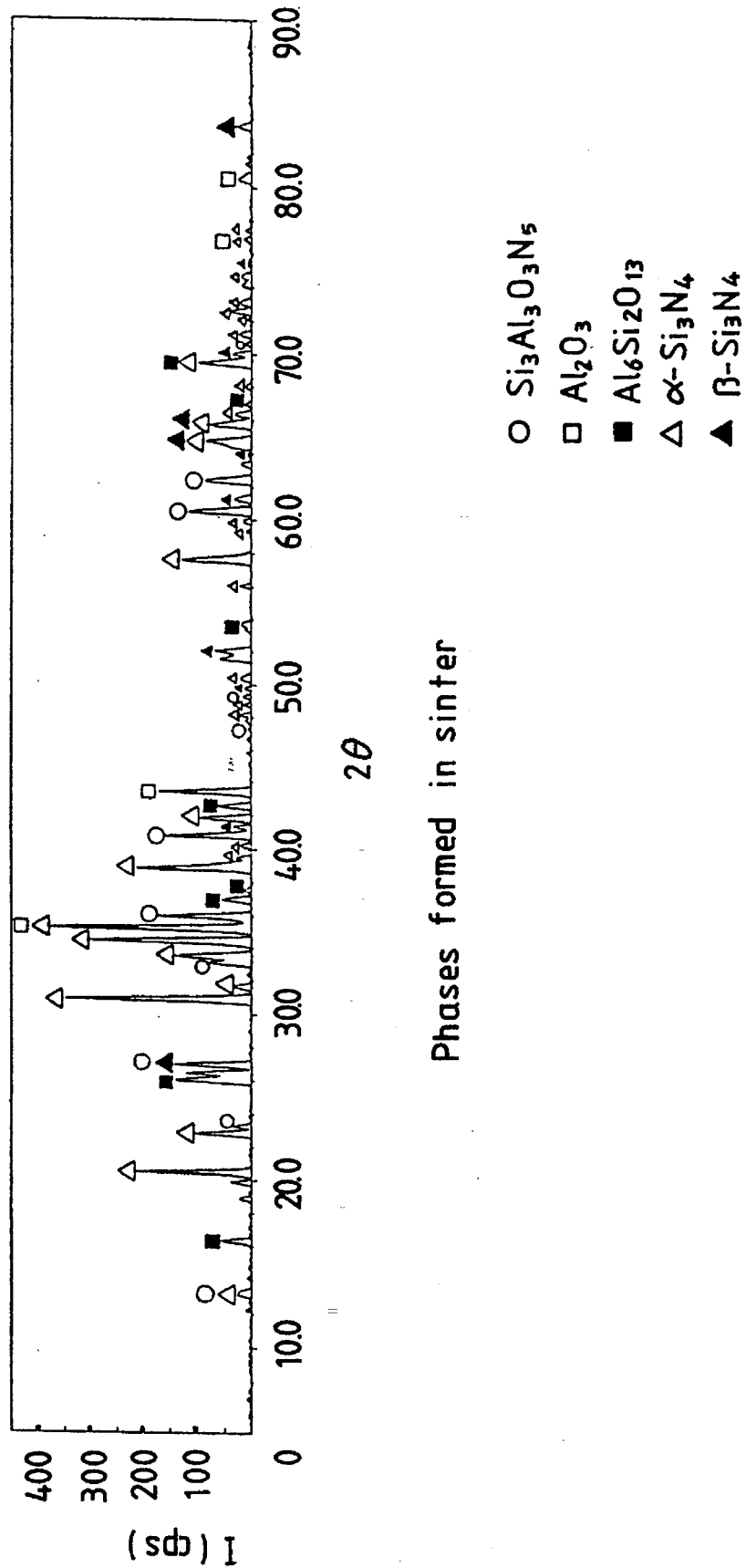
FIG. 6 is a diagram showing the results of identification by X-ray diffractometry of phases formed in a composite ceramic of FIG. 2.

FIG. 6 is a diagram showing the results of identification by X-ray diffractometry of the phases formed in a sinter obtained using Si and 35 wt. % of $Al_6Si_2O_{13}$ blended therewith, i.e., an X-ray diffraction pattern of the sinter, according to which $Si_3Al_3O_3N_5$ was detected. When consideration is given to the fact that SiON detected with an X-ray microanalyzer was not detected according to the X-ray diffraction pattern, SiON may probably be amorphous. Further, it is believed that the SiAlON phase in the form of a solid solutio may have a low heat conductivity.

Accordingly, it is believed that formation of the amorphous SiON or solid solution SiAlON phases on a very fine level to constitute multiple subphases may promote phonon scattering of this composite ceramic to lower the heat conductivity thereof.

A description will now be made on Example 2 wherein aluminum titanate ($Al_2TiO_5$) was used as the compound oxide in the process for producing a composite ceramic according to the present invention.

EXAMPLE 2

Figure 4:
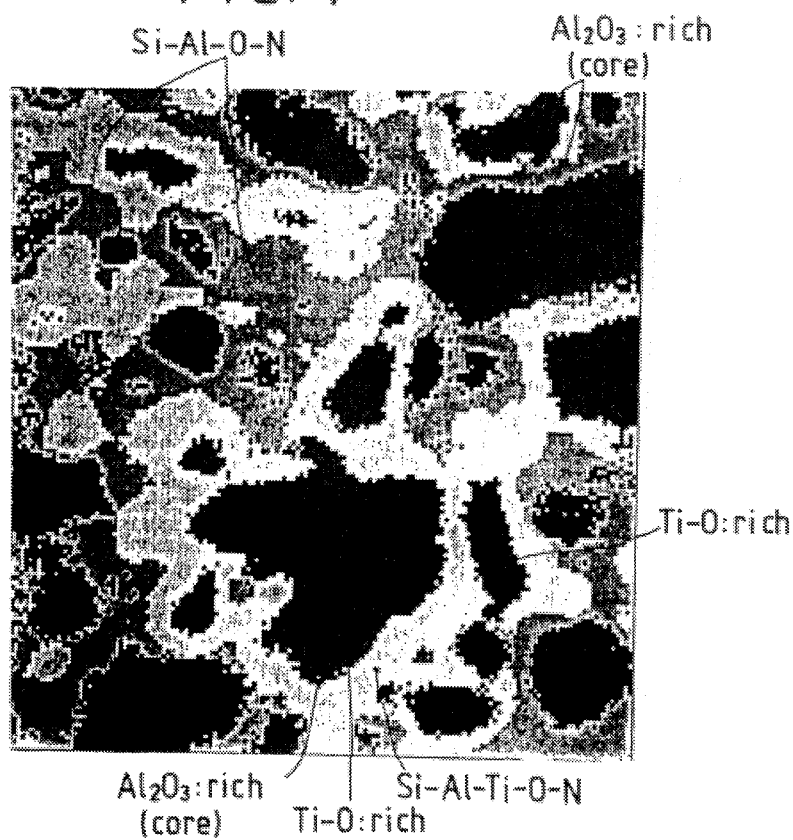
FIG. 4 is an analytic illustration drawn by an X-ray microanalyzer and showing the texture of a composite ceramic produced by reaction-sintering a mixture of Si and $Al_2TiO_5$ and subjecting the resulting sinter to oxidation treatment according to the process of the present invention for producing a composite ceramic.
Figure 5:
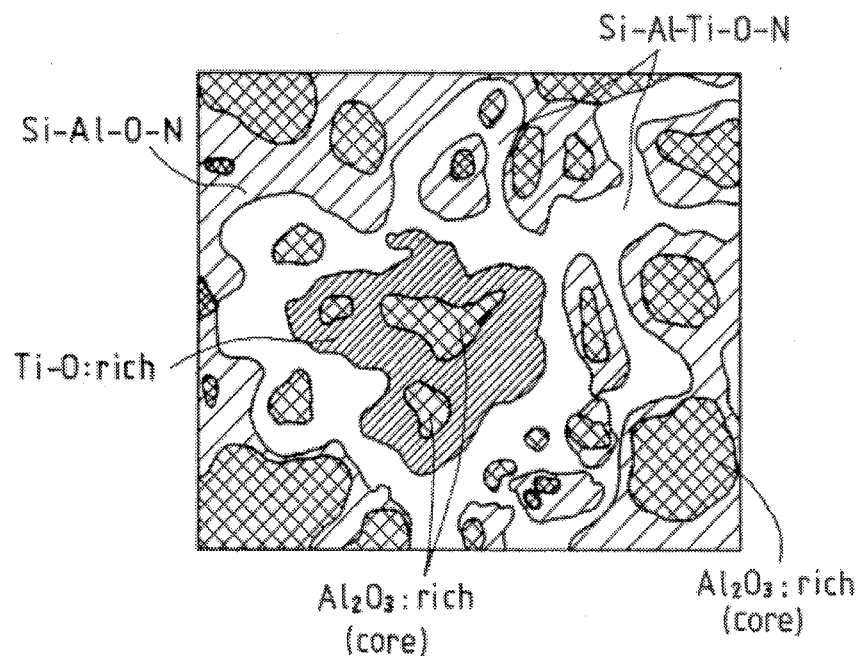
FIG. 5 is an illustration for partially explaining the analytic illustration of FIG. 4.

First, 65 wt. % of Si was blended with 35 wt. % (≈7.5 mol. %) of $Al_2TiO_5$ to prepare a mixed powder as the starting material. The mixed powder was formed into a formed material, which has then reaction-sintered in an atmosphere of $N_2$ at 1,400° C., and then heat-treated in air at 1,000° C., i.e., subjected to oxidation treatment. The texture of the resulting composite ceramic is shown in FIGS. 4 and 5.

For comparison with the composite ceramic sinter (invention product) of Example 2, Si and $Al_2TiO_5$ (7.5 mol. %≈35 wt. %) were blended with each other, and reaction-sintered in an atmosphere of $N_2$ in the same manner as in Example 2 to form a sinter of Comparative Example 3. Further, Si was blended with $Al_2O_3$ and $TiO_2$ (7.5 mol. %≈35 wt. %), and the resulting mixed powder was reaction-sintered in an atmosphere of $N_2$ to form a sinter of Comparative Example 4. The heat conductivities and flexural strengths of these sinter samples are shown in Table 3.

TABLE 3

Samples produced Using $Al_2TiO_5$ as Compound Oxide

| | Blending material | Proportion | Heat conductivity (W/m · K) | Flexural strength (MPa) |
|---|---|---|---|---|
| Ex. 2 | $Al_2TiO_5$ | 7.5 mol. % 35 wt. % | 3.6 | 190 |
| Comp. Ex. 3 | $Al_2TiO_5$ | 7.5 mol. % ≈35 wt. % | 4.0 | 175 |
| Comp. Ex. 4 | $Al_2O_3 + SiO_2$ | 7.5 mol. % ≈35 wt. % | 5.5 | 166 |

It is understood from the foregoing comparison that the sinters produced with addition of the compound oxide ($Al_2TiO_5$) could be lowered in heat conductivity as compared with the sinter produced with addition of the simple oxides ($Al_2O_3$ and $SiO_2$), and that the sinter subjected to oxidation treatment after reaction sintering could be further lowered in heat conductivity. It is understandable that the heat conductivity of a sinter can be lowered through conversion of Ti into TiN by reaction sintering and subsequent conversion of TiN into $TiO_2$ by oxidation for stabilization thereof.

The composite ceramic of Example 2 produced according to the aforementioned procedure was cut and polished on the cut surface thereof to examine the element distribution of the cut surface with an X-ray microanalyzer. The results are shown in FIGS. 4 and 5. In FIG. 4, the densest black core portions indicate $Al_2O_3$ (Al—O), the next densest black portions Si—Al—O—N, and the white portions Si—Al—Ti—O—N, while the phase surrounding the densest core portions of $Al_2O_3$ is a Ti—O-rich phase. It is understandable from FIGS. 4 and 5 that an Al-rich phase as a center is adjoined by an Ti- and Al-rich phase formed therearound, which is surrounded by an Si—Al—Ti—O—N phase formed therearound.

A description will now be made on Example 3 wherein $MgO.Al_2O_3.SiO_2$ [MAS] was used as the compound oxide in the process for producing a composite ceramic according to the present invention.

EXAMPLE 3

First, 65 wt. % of Si was blended with 35 wt. % of $MgO.Al_2O_3.SiO_2$ to prepare a mixed powder as the starting material. The mixed powder was formed into a formed material, which was then reaction-sintered in an atmosphere of $N_2$ at 1,400° C., and then heat-treated in air at 1,000° C., i.e., subjected to oxidation treatment, to produce a composite ceramic sinter.

For comparison with the composite ceramic sinter (invention product) of Example 3, Si and MgO.Al$_2$O$_3$.SiO$_2$ (35 wt. %) were blended with each other, and reaction-sintered in an atmosphere of N$_2$ in the same manner as in Example 3 to form a sinter of Comparative Example 5. the heat conductivities and flexural strengths of these sinter samples are shown in Table 4.

TABLE 4

Samples Produced Using MgO.Al$_2$O$_3$.SiO$_2$ as Compound Oxide

| | Blending material | Proportion | Heat conductivity (W/m · K) | Flexural strength (MPa) |
|---|---|---|---|---|
| Ex. 3 | MgOAl$_2$O$_3$Si$_2$ | 35 wt. % (see Table 1) | 2.5–2.6 | 210–222 |
| Comp. Ex. 5 | MgOAl$_2$O$_3$Si$_2$ | 35 wt. % | 2.8 | 188 |

It is understood from the foregoing that the sinter could be further lowered in heat conductivity when subjected to oxidation treatment after reaction sintering.

As described hereinbefore, the feature of a composite ceramic produced by nitriding and firing a mixture of Si and a compound oxide such as aluminum titanate (Al$_2$TiO$_5$) or mullite (Al$_6$Si$_2$O$_{13}$) as the starting material is that the disperse phase thereof is constituted of multiple subphases unlike the conventional ceramics produced using Si and a simple oxide such as aluminum oxide (Al$_2$O$_3$) added thereto. It is believed that such multiple subphases were formed through decomposition of the compound oxide and complicated reactions of the compound oxide with Si and nitrogen gas (N$_2$) in the atmosphere thereof in the course of nitriding and firing thereof. It is believed that the multiple subphases in the composite ceramic bring about scattering of phonons as the carrier of heat in the boundary portions thereof to endow the composite ceramic with a low heat conductivity.

Another example of a composite ceramic according to the present invention will now be described while referring to FIGS. 7 and 8.

This composite ceramic has a high toughness, a low heat conductivity and a porosity of at least 10%, and comprises coarse Si$_3$N$_4$ grains or ceramic fibers dispersed in a matrix phase composed of Si$_3$N$_4$ crystal grains of at most 3 μm in average size, an oxide and an oxynitride with O-containing reaction product layers formed in the boundaries between the above matrix phase and the above coarse Si$_3$N$_4$ grains or ceramic fibers. The oxide and the oxynitride may be selected from among SiO$_2$, TiO$_2$, Al$_6$Si$_2$O$_{13}$, Al$_2$O$_3$, SiAlON, TiAl$_2$O$_3$, and composite substances thereof. The average size of the coarse Si$_3$N$_4$ grains is preferably at least 10 μm. Further, a solid solution may be formed in the coarse Si$_3$N$_4$ grains. The coarse Si$_3$N$_4$ grains may be β-Si$_3$N$_4$. Ceramic fibers such as Si—C—O—N fibers and Si—Ti—C—O—N fibers can be used as the ceramic fibers dispersed in the matrix phase.

Generally known methods of enhancing the fracture toughness (K$_{IC}$) of a ceramic with a low fracture toughness include growth of grains, and combination of the ceramic with short fibers or long fibers to forma composite ceramic. In all of these methods, the amount of energy required for crack propagation is increased by deflection of a crack to thereby enhance the fracture toughness of the ceramic.

A description will,now be made on Example 4 wherein the process for producing a composite ceramic according to the present invention was carried out,

EXAMPLE 4

A β-type Si$_3$N$_4$ (βSi$_3$N$_4$) powder of 20 μm in average size was immersed in a solution of alkoxides, Y(OCH$_3$)$_3$ and Al(OCH$_3$)$_3$, to coat the surface of the powder with the alkoxides, and then heat-treated in an atmosphere of O$_2$ at 600° C., The heat-treated powder was mixed with an Si powder of 1.5 μm in average particle size and an Al$_6$Si$_2$O$_{13}$ powder of 3 μm in average particle size by ball milling. The resulting mixture was granulated with a spray drier to prepare a granulated powder. The granulated powder thus prepared was formed into a formed material by CIP at a pressure of 2,000 kgf/cm$^2$, The formed material was degreased and then reaction-sintered to form a sinter having a texture as shown in FIG. 7. The results of examination of the properties of such sinters are shown in Table 5.

TABLE 5

Samples Comprising Coarse Si$_3$N$_4$ Grains Dispersed in Matrix Phase with Reaction Product Layers

| Proportion of coarse Si$_3$N$_4$ (wt. %) | Four-point flexural strength (MPa) | Fracture toughness K$_{IC}$ (MPa · m$^{1/2}$) | Heat conductivity (M/w · K) |
|---|---|---|---|
| 2 | 124 | 2.8 | 2.6 |
| 5 | 155 | 3.1 | 3.1 |
| 10 | 179 | 4.5 | 3.7 |
| 20 | 199 | 5.5 | 3.3 |
| 30 | 208 | 5.8 | 3.9 |
| 40 | 211 | 6.9 | 4.1 |

Figure 7:
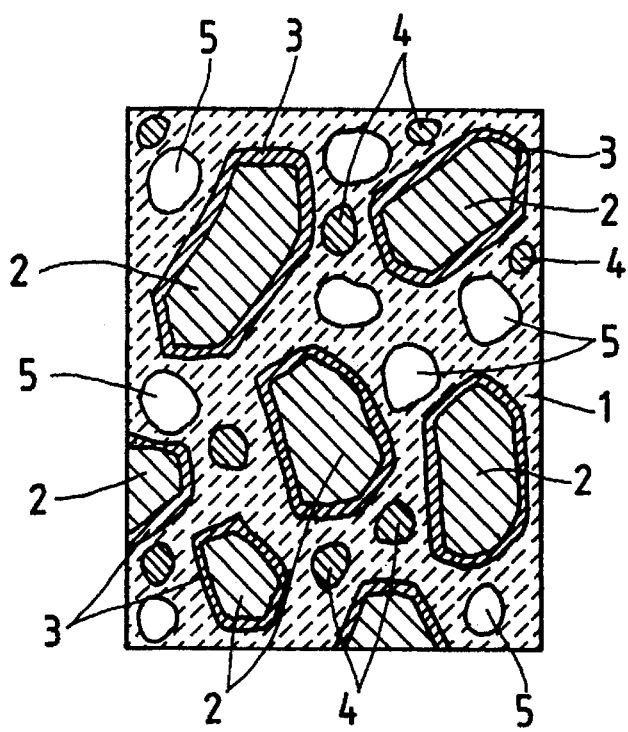
FIG. 7 is an illustration showing one example of the composite ceramic with a high toughness and a low heat conductivity according to the present invention.

As is understandable from FIG. 7, a ceramic sinter with a high toughness and a low heat conductivity has pores 5 and a disperse phase 4 in a matrix phase 1 composed of Si$_3$N$_4$ crystal grains, an oxide and an oxynitride, and further comprises coarse Si$_3$N$_4$ grains 2 dispersed in the matrix phase 1 with O-containing boundary reaction product layers 3 formed in the boundaries between the matrix phase 1 and the coarse Si$_3$N$_4$ grains 2. It is further understandable from Table 5 that the four-point flexural strength (MPa) and fracture toughness (K$_{IC}$) (MPa.m$^{1/2}$) of a ceramic sinter is increased but the heat conductivity (W/m.K) thereof is also increased, as the proportion (wt. %) of the coarse Si$_3$N$_4$ grains 2 dispersed in the matrix phase 1 is increased.

Next, in Comparative Examples 6 and 7, composite ceramic sinters were produced using the same starting materials as used in the above Examples in substantially the same manner as in the above Examples except that the surfaces of β-Si$_3$N$_4$ particles were not coated with the solution of the alkoxides.

The results of examination of the properties of these composite sinters are shown in Table 6. It was found out that these composite sinters were increased in four-point flexural strength (MPa) and fracture toughness K$_{IC}$ (MPa.m$^{1/2}$) as compared with a sinter not in the composite form, but were lower in strength and toughness than the sinters obtained in the above Examples. It was understood from this that dispersion of coarse Si$_3$N$_4$ particles in the reaction-sintered ceramic could improve the strength and toughness thereof.

TABLE 6

Samples comprising Coarse $Si_3N_4$ Grains Dispersed in Matrix Phase

| Proportion of coarse $Si_3N_4$ (wt. %) | Four-point flexural strength (MPa) | Fracture toughness $K_{IC}$ (MPa · $m^{1/2}$) |
| --- | --- | --- |
| 0 | 120 | 2.8 |
| 20 | 145 | 3.2 |
| 30 | 164 | 3.3 |
| 40 | 182 | 3.8 |
| 50 | 178 | 4.7 |

From the foregoing, a comparison of a composite ceramic sinter (invention product) of Example 4 produced using β-$Si_3N_4$ immersed in the solution of the alkoxides with the sinters of Comparative Example 6 and 7 can be summarized in the following Table 7. Specifically, the results of measurement of the flexural strengths, fracture toughnesses and heat conductivities of the sinters of Comparative Examples 6 and 7 produced by admixing an Si powder and $Al_6Si_2O_{13}$ with coarse β-$Si_3N_4$ particles not treated with the solution of the alkoxides, and reaction-sintering the resulting mixture in an atmosphere of $N_2$ are shown together with those of Example 4 in Table 7.

TABLE 7

| | β-$Si_3N_4$ (wt. %) | Flexural strength (MPa) | Fracture toughness $K_{IC}$ (MPa · $m^{1/2}$) | Heat conductivity (W/m · K) |
| --- | --- | --- | --- | --- |
| Ex. 4 | 20 | 199 | 5.5 | 3.3 |
| Comp. Ex. 6 | 20 | 145 | 3.2 | 3.4 |
| Comp. Ex. 7 | 50 | 178 | 4.7 | 4.5 |

It is understood from Table 7 that addition of β-$Si_3N_4$ immersed in the solution of the alkoxides and then oxidized remarkably improved the fracture toughness ($K_{IC}$) of the composite ceramic sinter as compared with addition of untreated β-$Si_3N_4$ though both cases were substantially the same with respect to heat conductivity. It is further understood from Table 7 that the increased amount of untreated β-$Si_3N_4$ added improved the fracture toughness ($K_{IC}$) of the sinter, but adversely increased the heat conductivity thereof. Thus, it is understandable the heat conductivity thereof. Thus, it is understandable that the four-point flexural strength (MPa) and fracture toughness ($K_{IC}$) (MPa.$m^{1/2}$) of a sinter are increased as the amount (wt. %) of coarse $Si_3N_4$ grains 2 dispersed in the matrix phase 1 is increased.

A description will now be made on Example 5 wherein composite ceramics of another type according to the present invention were produced.

EXAMPLE 5

Substantially the same procedure as in the above Example was repeated except that Si—C—O—N fibers of 1 mm in average length immersed int he solution of the alkoxides and heat-treated were used instead of the β-type $Si_3N_4$ (β-$Si_3N_4$) powder of 20 μm in average particle size immersed in the solution of the alkoxides and heat-treated. Thus, composite ceramic sinters, the textures of which were as shown in FIG. 8, were produced. The results of examination of the properties of these sinters are shown in Table 8.

TABLE 8

Samples Comprising Fibers with Reaction Product Layers Dispersed in Matrix Phase

| Proportion of fibers (wt. %) | Four-point flexural strength (MPa) | Fracture toughness $K_{IC}$ (MPa · $m^{1/2}$) | Heat conductivity (W/m · K) |
| --- | --- | --- | --- |
| 0.5 | 118 | 2.7 | 2.8 |
| 1 | 125 | 3.7 | 3.1 |
| 1.5 | 131 | 4.9 | 2.9 |
| 5 | 135 | 6.0 | 3.4 |
| 10 | 156 | 6.9 | 3.5 |
| 20 | 149 | 7.2 | 3.7 |

Figure 8:
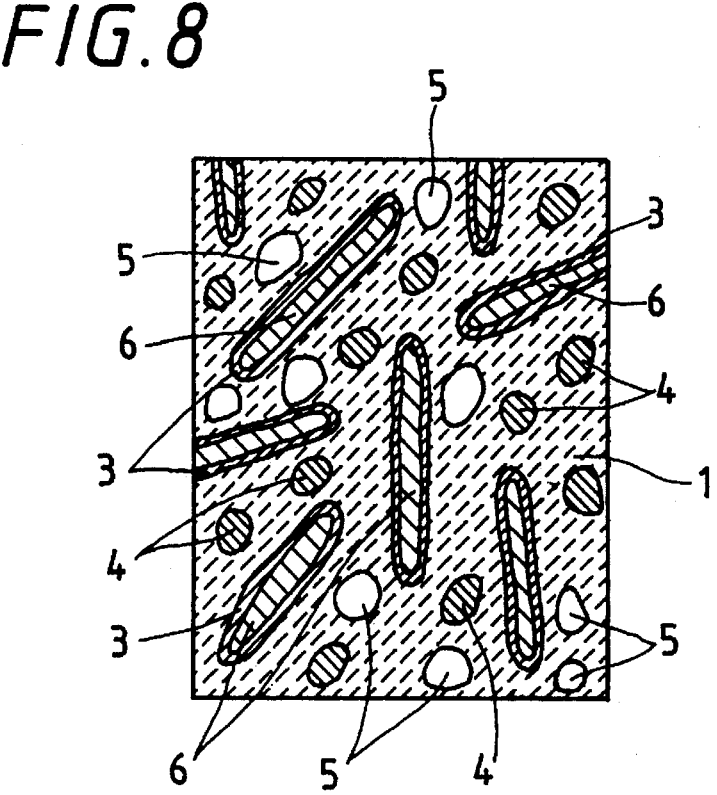
FIG. 8 is an illustration showing another example of the composite ceramic with a high toughness and a low heat conductivity according to the present invention.

As is understandable from FIG. 8, a ceramic sinter with a high toughness and a low heat conductivity has pores 5 and a disperse phase 4 in a matrix phase 1 composed of $Si_3N_4$ crystal grains, an oxide and an oxynitride, and further comprises Si—C—O—N fibers 6 dispersed in the matrix phase 1 with O-containing boundary reaction product layers 3 formed in the boundaries between the matrix phase 1 and the Si—C—O—N fibers 6. It is further understandable from Table 8 that the four-point flexural strength (MPa) and fracture toughness ($K_{IC}$) (MPa.$m^{1/2}$) of a ceramic sinter is increased but the heat conductivity (W/m.K) thereof is also increased, as the proportion (wt. %) of Si—C—O—N fibers 6 dispersed int eh matrix phase 1 is increased.

For comparison with the composite ceramic sinter (invention product) of Example 5, in Comparative Example 8, Si—C—O—N fibers of 1 mm in average length not immersed in the solution of the alkoxides were mixed with Si and $Al_6Si_2O_{13}$, and the resulting mixture was reaction-sintered in an atmosphere of $N_2$ according to substantially the same procedure as in the above Example to form a composite ceramic sinter. A comparison of these composite ceramic sinters is shown in Table 9.

TABLE 9

| | Proportion of Si—C—O—N fibers (wt. %) | Flexural strength (MPa) | Fracture toughness $K_{IC}$ (MPa · $m^{1/2}$) | Heat conductivity (W/m · K) |
| --- | --- | --- | --- | --- |
| Ex. 5 | 10 | 156 | 6.9 | 3.5 |
| Comp. Ex. 8 | 10 | 138 | 6.2 | 3.7 |

It is understood from Table 9 that addition of Si—C—O—N fibers immersed in the solution of the alkoxides and then oxidized could improve the fracture toughness ($K_{IC}$) of the composite ceramic sinter as compared with addition of untreated Si—C—O—N fibers though both cases were substantially the same with respect to heat conductivity.

A description will now be made on another example of the process for producing a composite ceramic. according to the present invention.

EXAMPLE 6

A composite ceramic of Example 6 was produced according to the following procedure. A coarse β-$Si_3N_4$ powder was immersed in a solution of tetraethoxysilane, taken up, and then heat-treated in air at 500° C. The foregoing operation was repeated three times. Thereafter, the surface of the resulting powder was observed and analyzed with a TEM and an EDX to confirm formation of $SiO_2$ film layers having a thickness of about 50 μm. A composite ceramic was produced using this powder under the same conditions as in the above Example in substantially the same manner as in the above Example. In this composite ceramic the proportion of coarse β-Si$_3$N$_4$ dispersed in a matrix phase was represented by a volume fraction (Vf) of 20 vol. %. This composite ceramic was evaluated with respect to four-point flexural strength (MPa), fracture toughness (K$_{IC}$) (MPa.m$^{1/2}$) and heat conductivity (W/m.K). The results are shown in Table 10.

A description will now be made on Example 7 wherein the process for producing a composite ceramic with a high toughness and a low heat conductivity according to the present invention was carried out.

EXAMPLE 7

A lowly heat-conductive composite ceramic of this Example was produced according to the following procedure. A coarse β-Si$_3$N$_4$ powder was immersed in a solutio of Ti(OCH$_3$)$_4$, taken up, and then heat-treated in air at 500° C. Thereafter, the surface of the resulting powder was observed and analyzed with a TEM and an EDX to confirm formation of TiO$_2$ film layers having a thickness of about 40 μm. A composite ceramic was produced using this powder under the same conditions as in Example 1 in substantially the same manner as in Example 1. In this composite ceramic, the proportion of the coarse β-Si$_3$N$_4$ dispersed in a matrix phase was represented by a volume fraction (Vf) of 20 vol. %. This composite ceramic was evaluated with respect to four-point flexural strength (MPa), fracture toughness (K$_{IC}$) (MPa.m$^{1/2}$) and heat conductivity (W/m.K). The results are shown in Table 10.

A description will now be made on Example 8 wherein the process for producing a composite ceramic with a high toughness and a low heat conductivity according to the present invention was carried out.

EXAMPLE 8

A lowly heat-conductive composite ceramic of this Example was produced according to the following procedure. A coarse β-Si$_3$N$_4$ powder was heat-treated in air in a furnace at 1,000° C. for about 1.5 hours to prepare a sinter. The surface of this sinter was observed with a TEM to confirm formation of oxide film layers having a thickness of about 60 μm on the surface of β-Si$_3$N$_4$. This sinter was evaluated with respect to four-point flexural strength (MPa), fracture toughness (K$_{IC}$) (MPa.m$^{1/2}$) and heat conductivity (W/m.K). The results are shown in Table 10.

A description will now be made on Example 9 wherein the process for producing a composite ceramic with a high toughness and a low heat conductivity according to the present invention was carried out.

EXAMPLE 9

A composite ceramic of this Example was produced according to the following procedure. An α-Si$_3$N$_4$ powder was blended and mixed with 5% of a Y$_2$O$_3$ powder and 5% of an Al$_2$O$_3$ powder. The resulting mixture was hand-pressed into a formed material, which was then calcined in an atmosphere of N$_2$ at 1,400° C. to form a sinter. This sinter was crushed, and classified to collect a coarse Si$_3$N$_4$-based solid solution powder of about 20 μm in average particle size. Using this coarse Si$_3$N4-based solid solution powder as the powder to be dispersed in a matrix phase, the composite ceramic was produced under the same conditions as in the above Examples in substantially the same manner as in the above Examples. In this composite ceramic, the proportion of coarse β-Si$_3$N$_4$ dispersed in the matrix phase was represented by a volume fraction (Vf) of 20 vol. %. This composite ceramic was evaluated with respect to four-point flexural strength (MPa), fracture toughness (K$_{IC}$) (MPa.m$^{1/2}$) and heat conductivity (W/m.K). The results are shown in Table 10.

For comparison with the composite ceramics of the foregoing Examples, untreated coarse β-Si$_3$O$_4$ particles were added to Si and Al$_6$Si$_2$O$_{13}$, and the resulting mixture was reaction-sintered in an atmosphere of N$_2$ to form a sinter of Comparative Example 9.

TABLE 10

| | Comparison of Examples in Properties | | |
|---|---|---|---|
| Example | Four-point flexural strength (MPa) | Fracture toughness K$_{IC}$ (MPa · m$^{1/2}$) | Heat conductivity (W/m · K) |
| Ex. 6 | 211 | 3.9 | 3.5 |
| Ex. 7 | 201 | 3.9 | 3.4 |
| Ex. 8 | 206 | 3.9 | 3.5 |
| Ex. 9 | 167 | 3.2 | 3.0 |
| Comp. Ex. 9 | 142 | 3.2 | 3.4 |

As is understandable from the foregoing, the fracture toughness (K$_{IC}$) can be improved without any substantial change in heat conductivity by preliminarily forming oxide film layers on the surfaces of coarse β-Si$_3$N$_4$.

What is claimed is:

1. A composite ceramic having a porosity of at least 10% and comprising all of elements Si, O and N, and at least one element selected from the group consisting of Al, Ti, Zr, Li, Mg and P;

wherein said elements in part form a matrix phase of Si$_3$N$_4$ having an average grain size of at most 3 μm, wherein said elements further in part form disperse phases in said matrix phase, said disperse phases containing multiple subphase structures constituted of subphases adjoining each other, wherein said disperse phases contain at least one selected from the group consisting of Al$_6$Si$_2$O$_{13}$, SiAlON, TiON, SiON and A$_2$TiO$_5$, and said composite ceramic further comprises at least one reinforcing material selected from the group consisting of coarse Si$_3$N$_4$ grains and ceramic fibers dispersed in said matrix phase.

2. A composite ceramic as claimed in claim 1, wherein an O-containing reaction product phase is formed in boundaries between said matrix phase and said reinforcing material selected from the group consisting of at least one of said Si$_3$N$_4$grains and said ceramic fibers.

3. A composite ceramic as claimed in claim 1, wherein a subphase in a central portion of said multiple subphase structure of said disperse phase is an Al-rich subphase.

4. A composite ceramic as claimed in claim 2, wherein a subphase in a central portion of said multiple subphase structure of said disperse phase is an Al-rich subphase.

5. A composite ceramic as claimed in any one of claims 1, 2, 3, or 4, wherein said reinforcing material comprises said coarse Si$_3$N$_4$ grains which have an average size of at least 10 μm.

6. A composite ceramic as claimed in any one of claims 1, 2, 3, or 4, wherein a solid solution is formed in said coarse Si$_3$N$_4$ grains.

7. A composite ceramic as claimed in any one of claims 1, 2, 3, or 4, wherein said reinforcing material comprises said coarse $Si_3N_4$ grains which are $\beta$-$Si_3N_4$.

8. A composite ceramic having a porosity of at least 10% and comprising all of elements Si, O and N, and at least one element selected from the group consisting of Al, Ti, Zr, Li, Mg and P;

said composite ceramic comprising a matrix phase of $Si_3N_4$ having an average grain size of at most 3μm, wherein disperse phases in said matrix phase contain multiple subphase structures constituted by some subphases surrounding central subphases, and wherein said disperse phase contains at least one selected from the group consisting of $Al_6Si_2O_{13}$, SiAlON, TiON, SiON and $Al_2TiO_5$.

9. A composite ceramic as claimed in claim 8, wherein said central subphases comprise an Al-rich subphase.

* * * * *